(No Model.)
G. WINZENRIED.
TOOL FOR REMOVING CHIPS FROM MORTISES.
No. 320,736. Patented June 23, 1885.
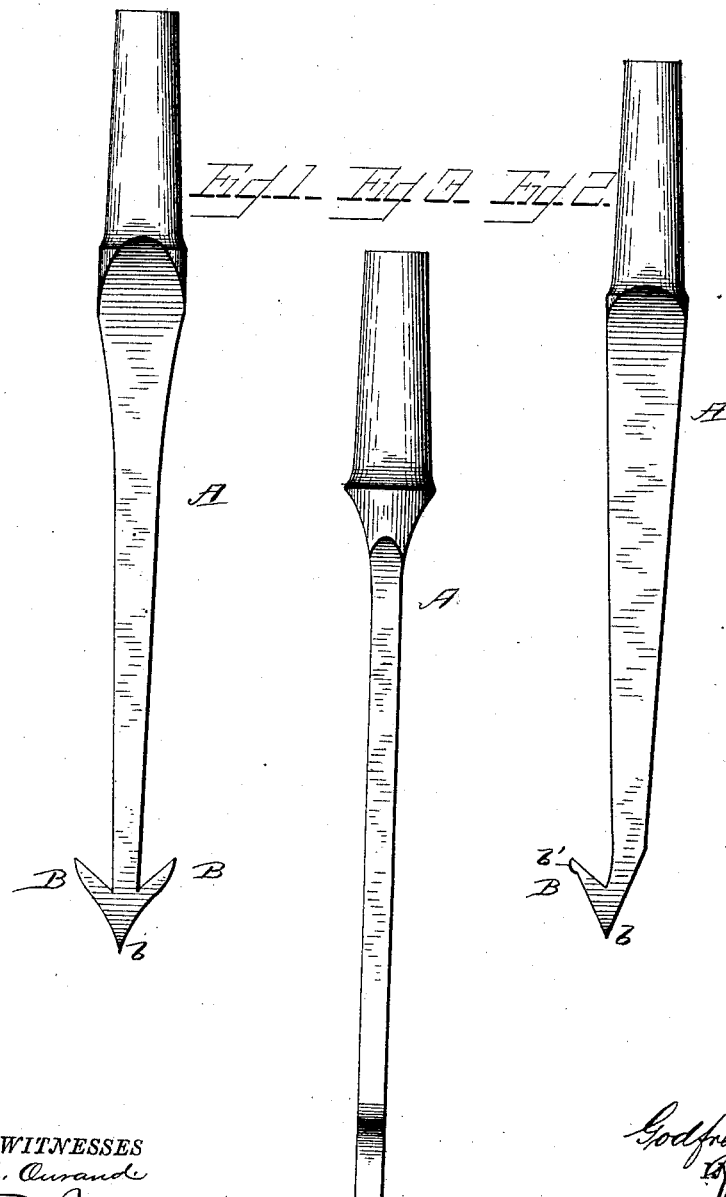

UNITED STATES PATENT OFFICE.

GODFREY WINZENRIED, OF SCHULENBURG, TEXAS.

TOOL FOR REMOVING CHIPS FROM MORTISES.

SPECIFICATION forming part of Letters Patent No. 320,736, dated June 23, 1885.

Application filed March 16, 1885. (No model.)

*To all whom it may concern:*

Be it known that I, GODFREY WINZENRIED, a citizen of the United States of America, residing at Schulenburg, in the county of Fayette and State of Texas, have invented certain new and useful Improvements in Mortising-Chisels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in implements for removing the chips from mortises; and it consists in the implement hereinafter set forth and explained.

In the accompanying drawings, which illustrate my invention, Figure 1 is a side view. Fig. 2 is a side view of a modification of my improvement. Fig. 3 is an edge view.

A represents the body portion of the implement, which is substantially rectangular in cross-section and tapers from its upper portion toward its point. The upper portion is provided with a shank, which is formed integral with the implement.

The lower end of the body portion or point of the implement is provided with barbs B B, which project from each side of the same, said barbs converging toward each other and terminating in a point, $b$. The upper ends of the barbs B are sharpened, as shown in Fig. 1.

If desirable, the implement may be constructed as shown in Fig. 2, in which case but a single barb is employed, the point or lower edge of said barb being on a line with the inner edge of the body portion, and the upper portion of the barb B may be provided with a rounded projecting portion, $b'$, which will prevent the point of the barb catching in the side of the mortise when the implement is being withdrawn therefrom.

When it is desired to use the hereinbefore-described implement, the same is inserted in the mortising-machine in place of the chisel, and the machine set in motion. The barbs thereon will then engage with the chips and remove the same from the mortise.

This implement is particularly desirable when removing the chips from mortises which are made in pieces of timber which cannot be readily turned.

I claim—

The tool herein described for removing chips from mortises, the same consisting of a body portion, A, which is tapered from its shank to near its point, the said point being provided with a barbed portion having a round swell, $b'$, substantially as shown, and for the purpose set forth.

In testimony whereof I affix my signature in presence of two witnesses.

GODFREY WINZENRIED.

Witnesses:
E. CH. BAUMGARTEN,
L. SCHLOTTMANN.